US006789537B1

(12) United States Patent
Lutz et al.

(10) Patent No.: US 6,789,537 B1
(45) Date of Patent: Sep. 14, 2004

(54) FOOT OPERATED GRILL COVER LIFT

(76) Inventors: Kenneth R. Lutz, 222 Bernstein Blvd., Center Moriches, NY (US) 11934; Jill D. Lutz, 222 Bernstein Blvd., Center Moriches, NY (US) 11934

( * ) Notice: Subject to any disclaimer, the term of this patent is extended or adjusted under 35 U.S.C. 154(b) by 0 days.

(21) Appl. No.: 10/291,329

(22) Filed: Nov. 8, 2002

Related U.S. Application Data

(60) Provisional application No. 60/337,457, filed on Nov. 8, 2001.

(51) Int. Cl.[7] .................................................. A47J 37/00
(52) U.S. Cl. .................. 126/25 R; 126/41 R; 126/192; 220/263; 110/178
(58) Field of Search .............................. 126/41 R, 25 R, 126/200, 192, 39 B; 220/262–264, 908; 110/178; 49/357, 347, 379

(56) References Cited

U.S. PATENT DOCUMENTS 1,948,413 A * 2/1934 Carola ........................ 220/263
2,096,506 A * 10/1937 Brandstrom ................. 248/147
2,910,206 A * 10/1959 Hodgson ................... 220/23.87
6,581,587 B1 * 6/2003 Helms ........................ 126/25 R

FOREIGN PATENT DOCUMENTS

GB          2323019         *   9/1998

* cited by examiner

Primary Examiner—James C. Yeung
(74) Attorney, Agent, or Firm—William L. Botjer

(57) ABSTRACT

A device for foot operation of the cover of a cooking instrument, such as a barbecue grill, includes a lever located so as to be operated by a foot, a lift support attached to the cover of the cooking instrument and a linkage connecting the foot operated lever and the lift support. A spring connected to the lift support assists in operating the lid with only a small amount of foot pressure. The foot operated lever can be moved so as to lock the cover in the open position. This enables the cover of the cooking instrument to be safely and conveniently operated in a "no hands" manner.

20 Claims, 10 Drawing Sheets

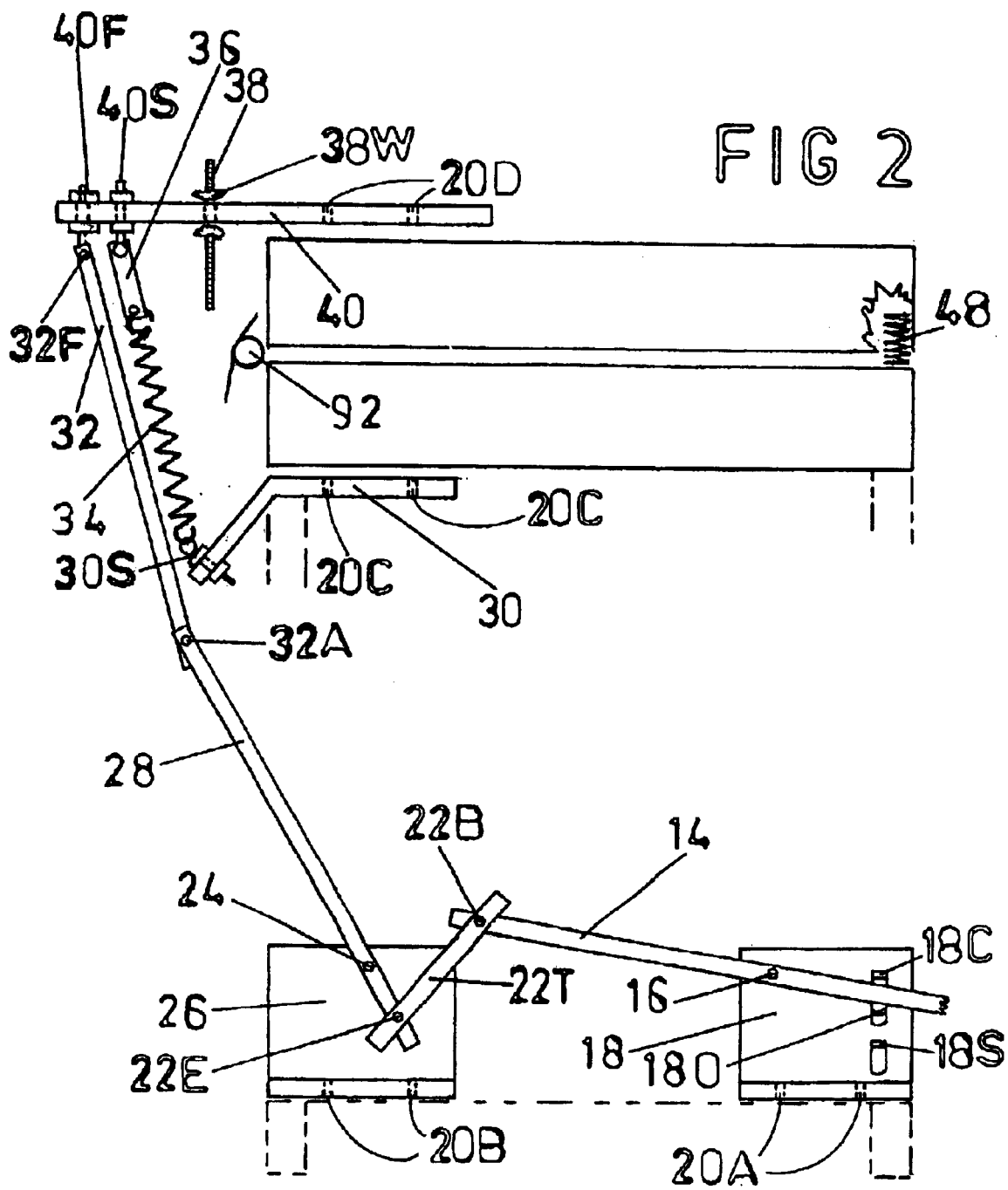

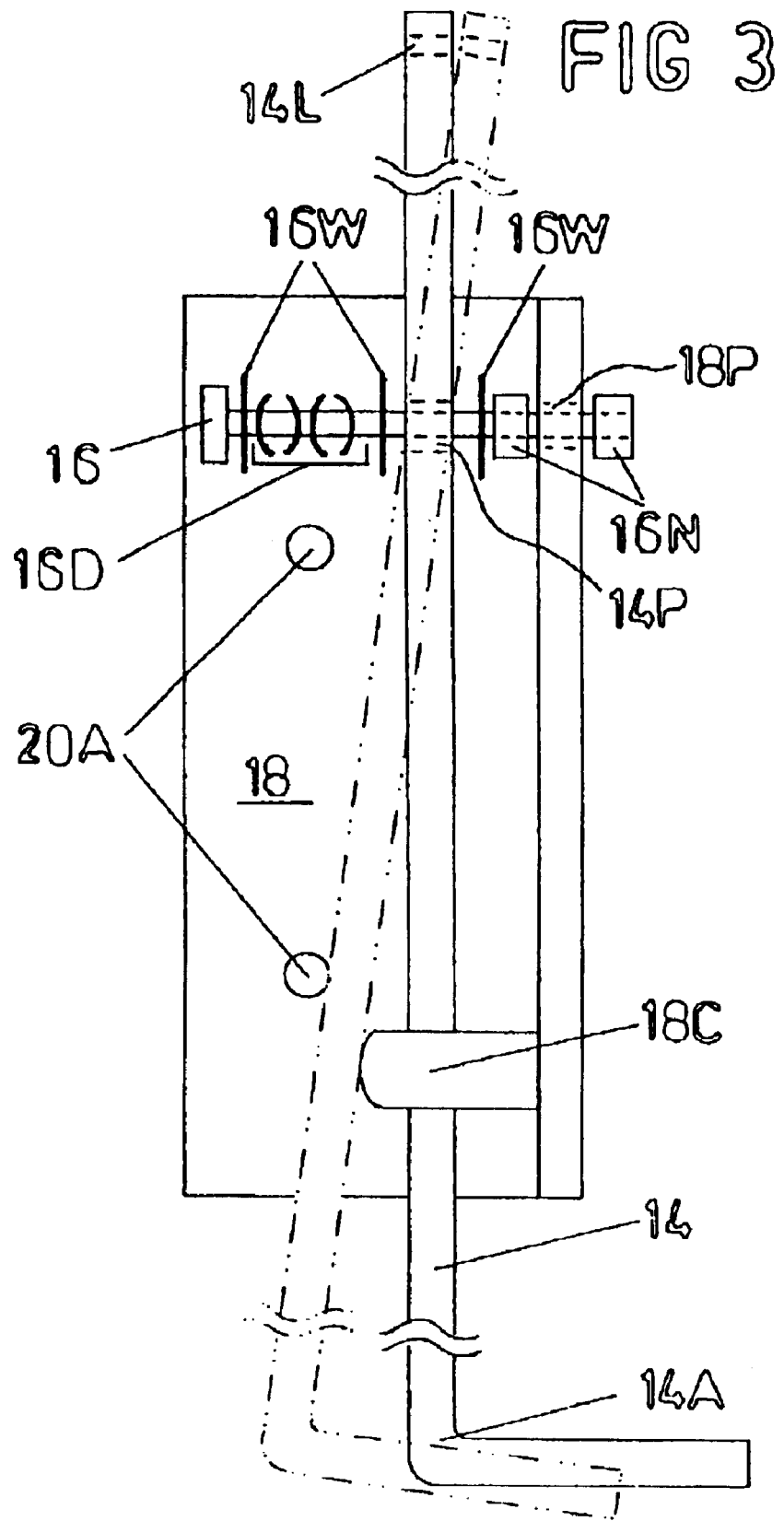

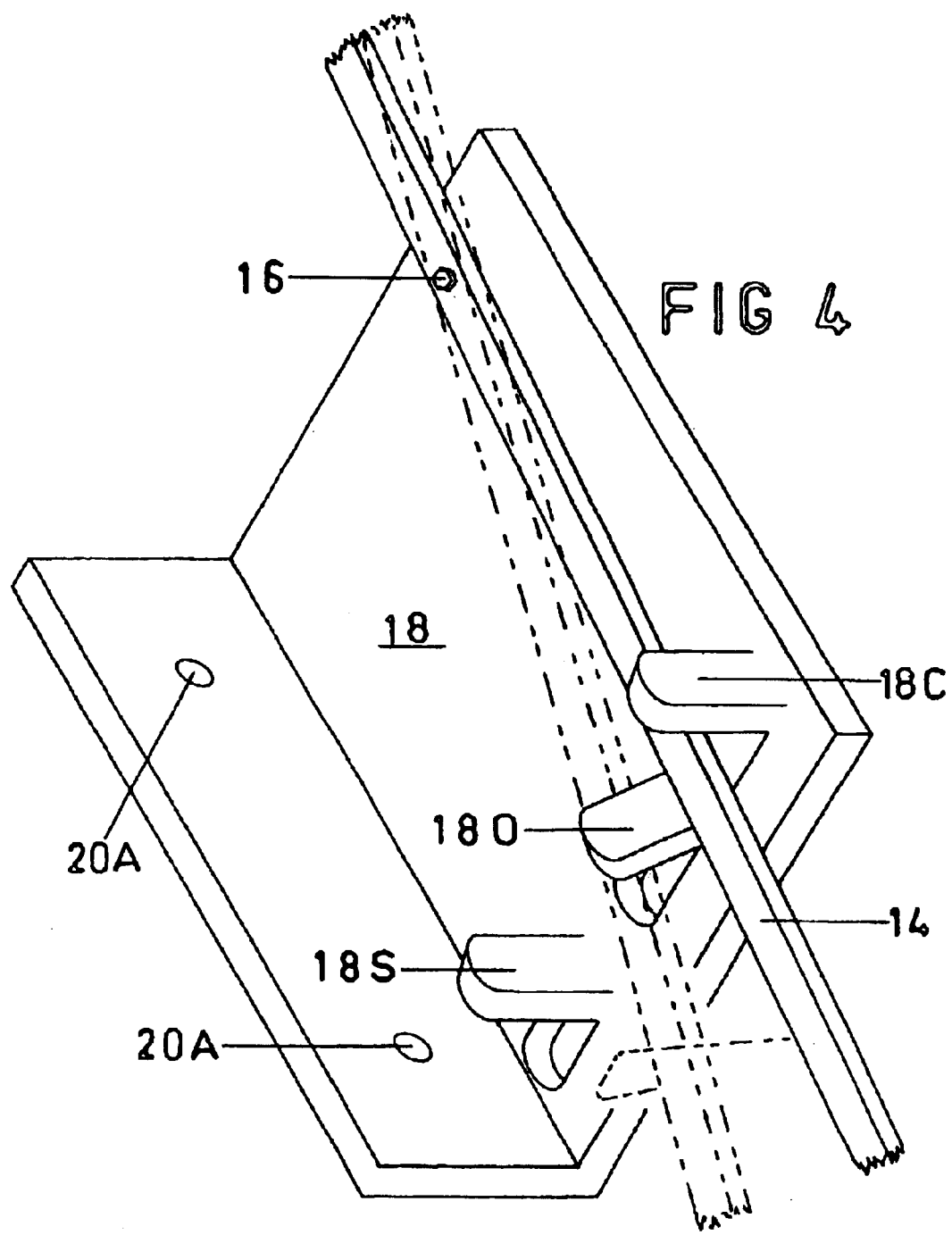

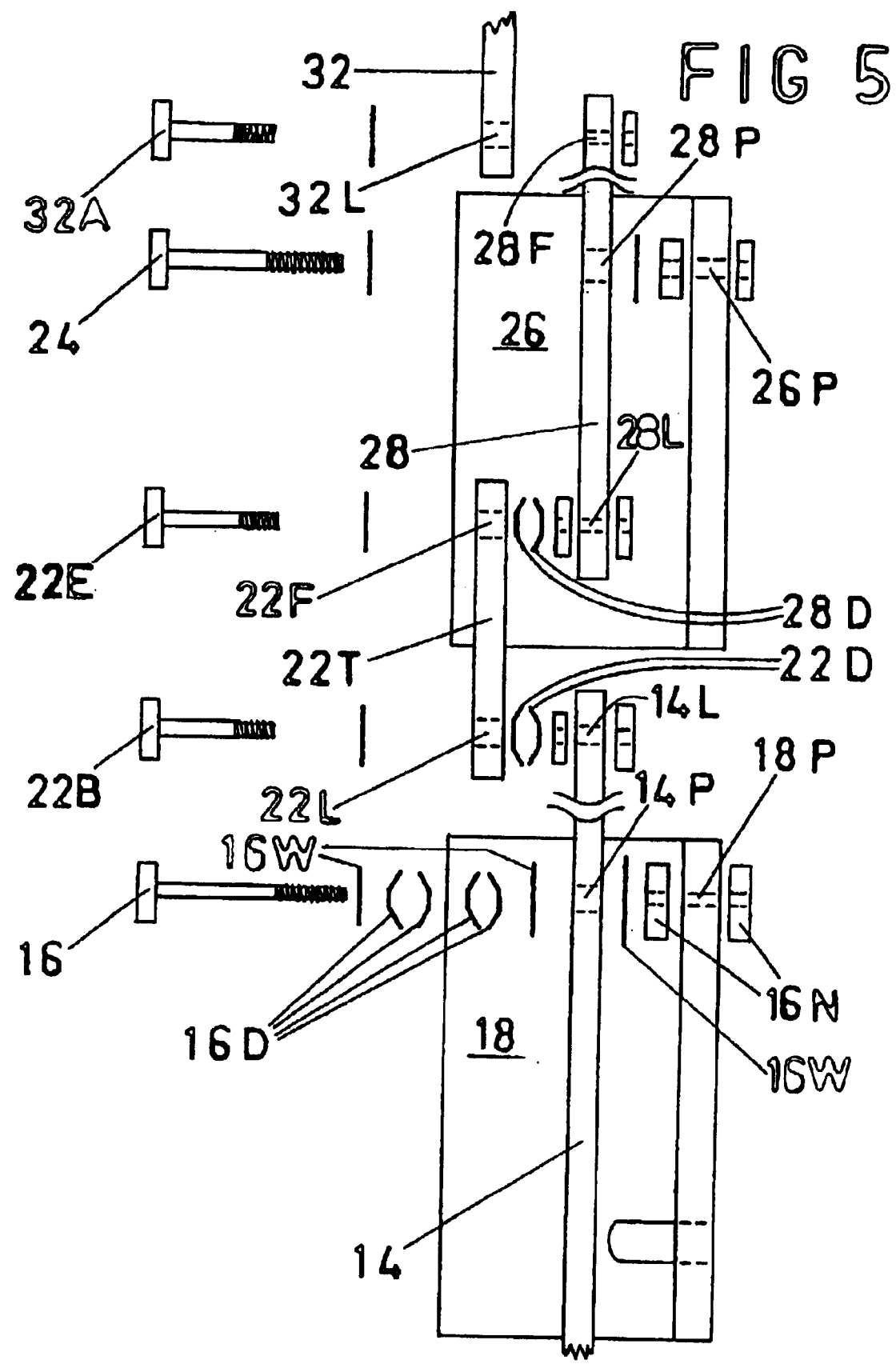

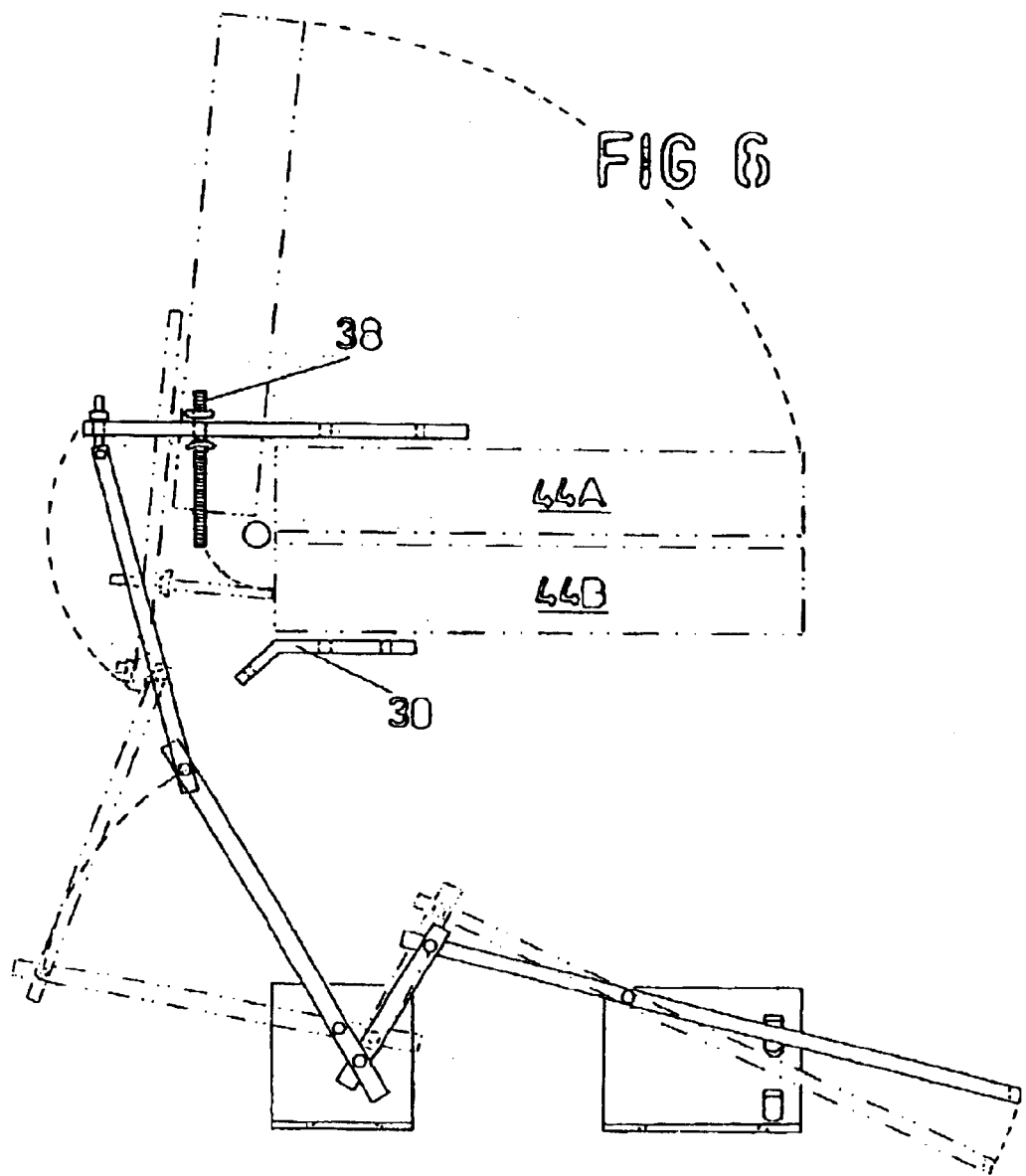

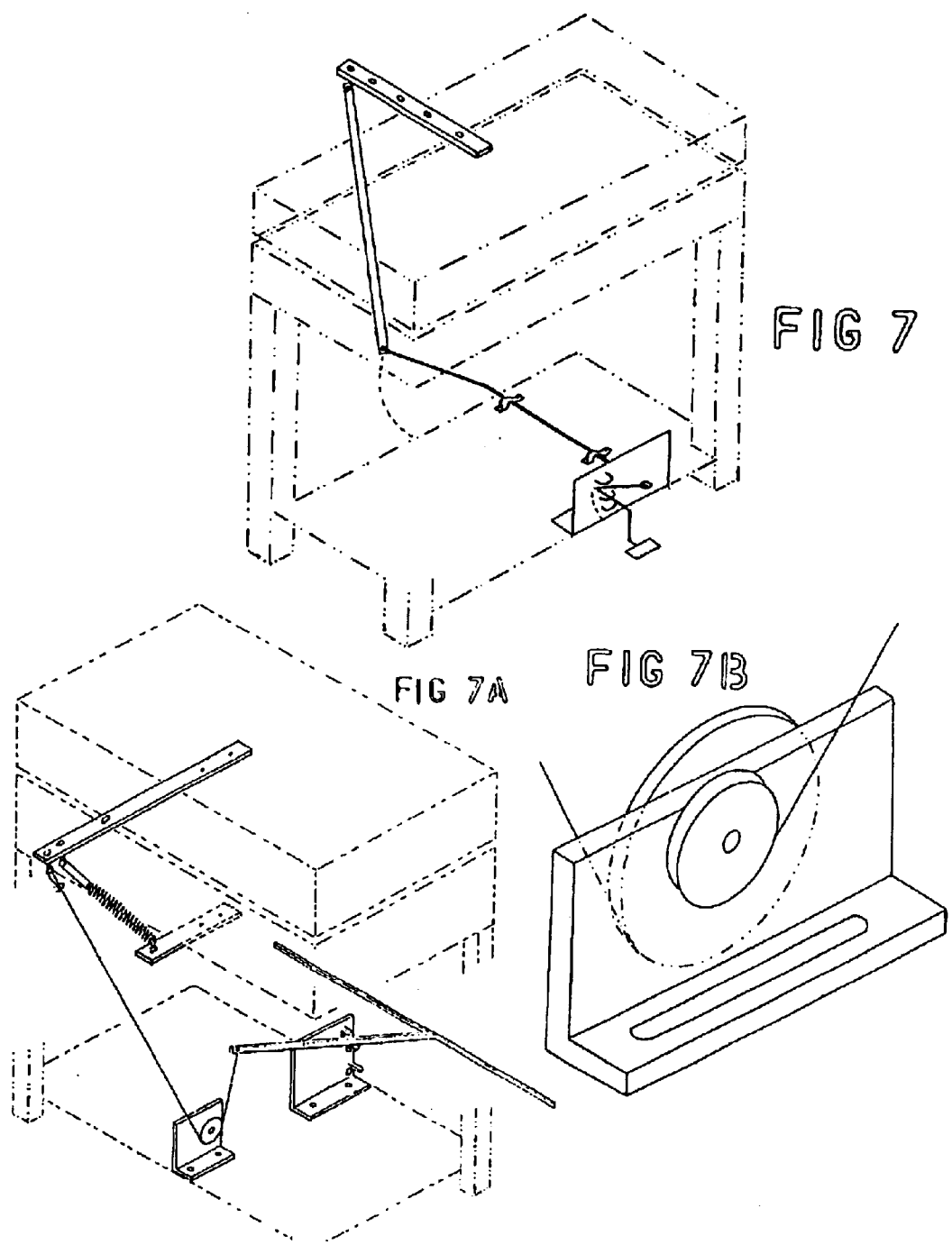

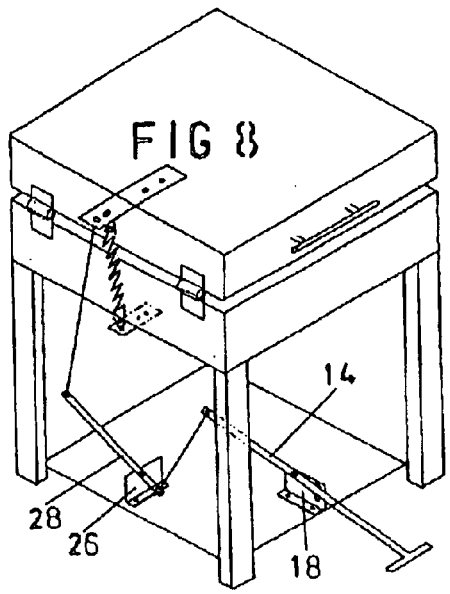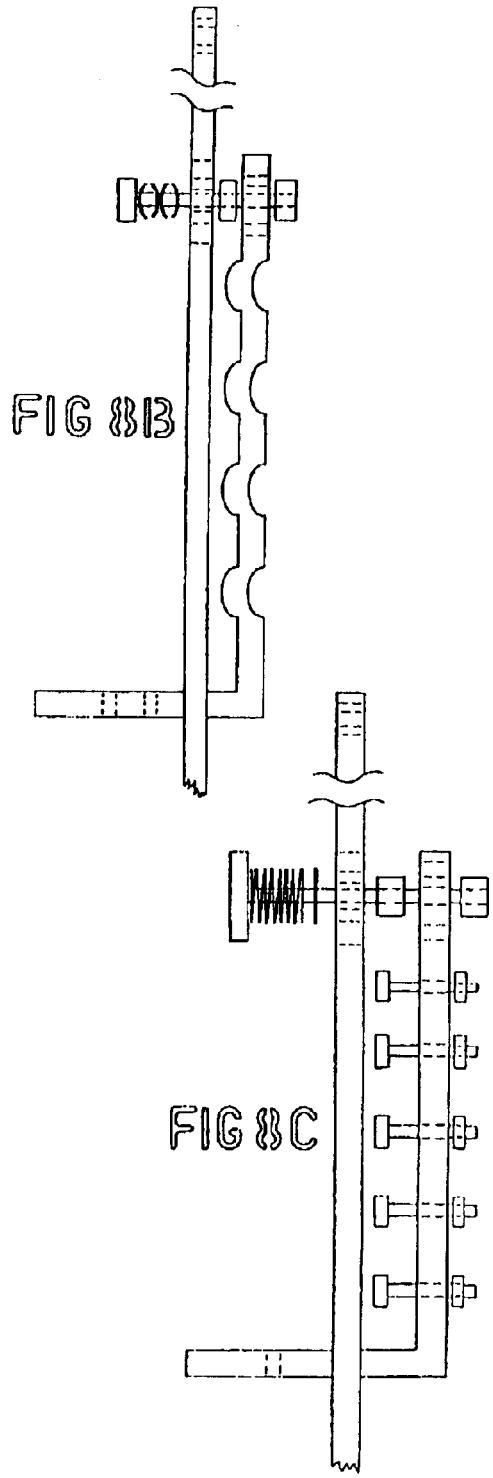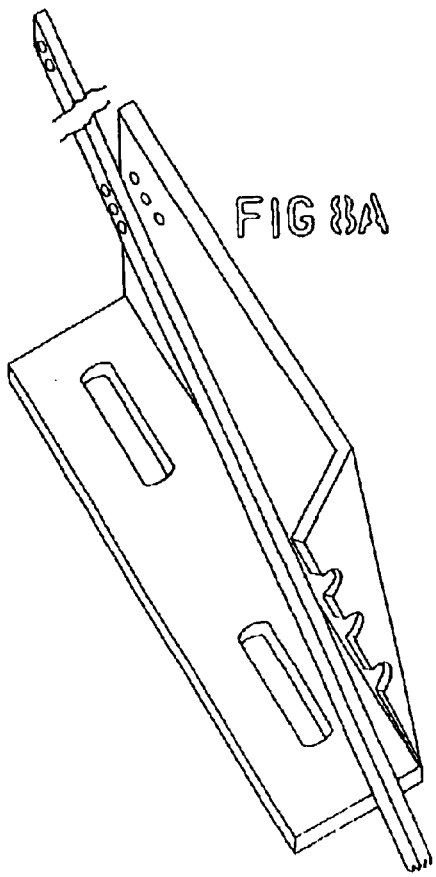

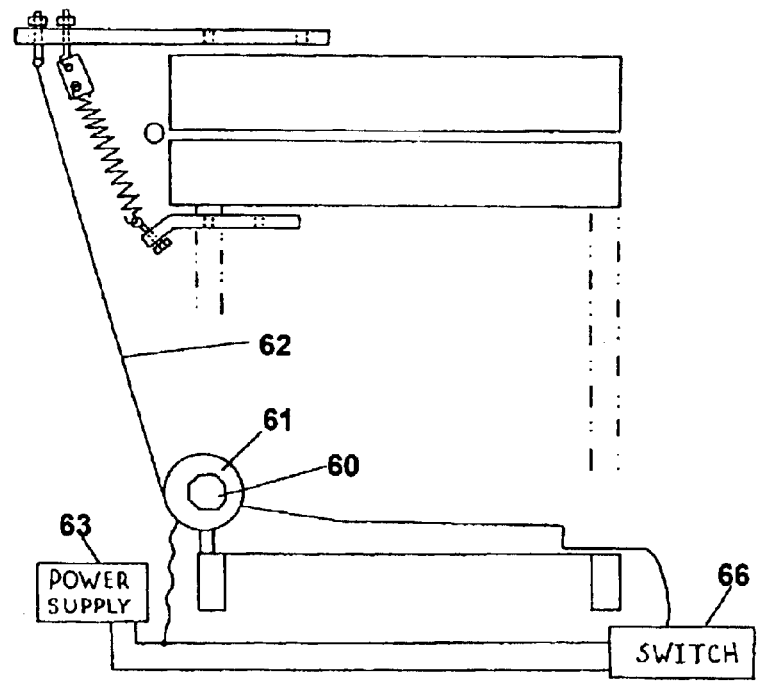
FIG 10
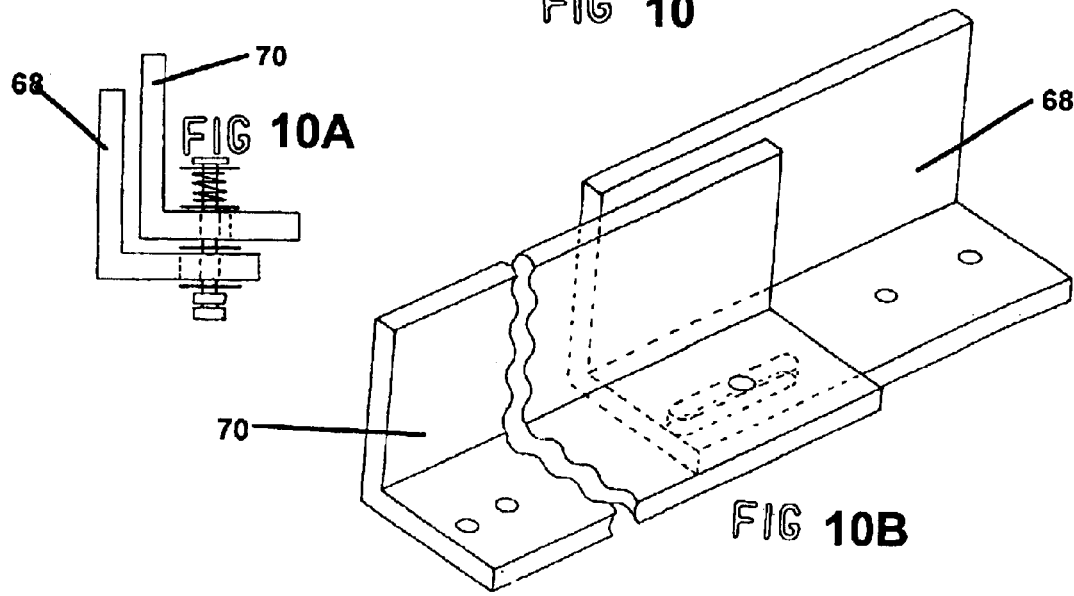
FIG 10A
FIG 10B

FOOT OPERATED GRILL COVER LIFT

REFERENCE TO RELATED APPLICATIONS

This application claims the priority of U.S. Provisional patent application Ser. No. 60/337,457 filed Nov. 8, 2001.

BACKGROUND OF THE INVENTION

1. Field of the Invention

This invention relates to grills, barbecues and cooking instruments and specifically to a foot operated device to open and close a hinged cover (lid) safely and conveniently, while heating and cooking.

2. Discussion of the Prior Art

Three out of four American households own barbecues. Americans light their barbecues 2.9 billion times a year. Originally outdoor charcoal and wood barbecues came with no covers. Thereafter with covers, and then with hinged covers. Followed by gas grills with hinged covers and then covers with see through fronts. Temperature gauges and other devices were then installed on them. The advantages of leaving the cover closed while heating and cooking is enhanced by the present invention.

Keeping the cover closed during cooking will retain a remarkable amount of the heat and moisture (at least fifty to seventy five percent) along with other gases, promoting even and thorough cooking. When keeping the cover closed there is less chance of charring (blackening) the foods because the moisture is enclosed. The applicant's present embodiments are directed toward the significant easing of the operation of the cover (closing and opening) of cooking instruments, grills and the like, in a manner that focuses on substantially improving the overall operation of the cover while cooking.

As is seen in the prior art below there are a number of designs to keep the cover partially open and that enhance the use of the cover:

U.S. Pat. No. 4,895,130 by Staschke, M. issued 1990, uses an attachable metal toothed device with a handle. It is manually adjusted by hand for positioning the cover height to which would be attached about the front of cooking instrument to hold the cover open.

U.S. Pat. No. 5,458,053 by Hsiao; Yung-Fang issued 1995 uses a relatively complex mechanical hand cranking system for positioning the cover, is probably cost effective for only commercially sized cooking instruments.

U.S. Pat. No. 5,918,588 by Garcia V. issued 1999 uses a electromechanical device for the automatic closing and opening of the cover with electric power, this is likely useful for an "assembly line" of food that always has a constant size or mass.

U.S. Pat. No. 5,829,426 by Cloutier, A. issued 1998 uses a handle operated lid positioner for different openings.

Finally, U.S. Pat. No. 6,112,336 by Markle, issued 2000 shows a cable operated device for lifting a toilet seat.

SUMMARY OF THE INVENTION

The present invention is directed to a device for foot operation of the cover of a cooking instrument, such as a barbecue grill, and includes a lever located so as to be operated by a foot, a lift support attached to the cover of the cooking instrument and a linkage connecting the foot operated lever and the lift support. A spring connected to the lift support assists in operating the lid with only a small amount of foot pressure. The foot operated lever can be moved so as to lock the cover in the open, partially opened, or closed positions. This enables the cover of the cooking instrument to be safely and conveniently operated in a "no hands" manner.

"No Hands" operation makes the cooking instrument safer and more convenient to operate, as the operator does not have to put down cooking utensils or food when opening the cover. Ease of cover operation means that the grill can be operated more frequently with the cover closed, which translates to speedier and healthier cooking using less fuel. Furthermore, ease of operation will enable the handicapped or elderly to cook in a safer and more convenient manner.

BRIEF DESCRIPTION OF THE DRAWINGS

For a better understanding of the invention, reference is made to the following drawings which are to be taken in conjunction with the detailed description to follow in which:

FIG. 2 Shows a left side view of main elements with the cover of the cooking instrument in the closed position.

FIG. 3 Shows an exploded view of control lever 14 and control bracket 18, showing the extended horizontal movement of control lever 14.

FIG. 4 Shows a left front view of control lever 14 moving vertically and horizontally with control bracket 18.

FIG. 5 Shows a top exploded view of control lever 14, driven lever 28, control bracket 18 and driven bracket 26, and a partial view of link arm 32.

FIG. 6 Shows a side elevation of the main elements with the movement of the cover in the open position shown in phantom.

FIG. 7 Shows an alternate front view of an additional embodiment cooking instrument of utilizing a Rod Arm System.

FIG. 7A Shows a rear view of an additional embodiment of the cooking instrument with an lever, pulley and wire cover lifting system.

FIG. 7B Shows a left rear view of a double pulley system.

FIG. 8 Shows a front view of an additional embodiment of a cooking instrument with hinges for cover lid to the left side of the operator FIG. 8A Shows a view with of a multi-position control bracket with a multi-position control lever.

FIG. 8B Shows a view of the multi-position control bracket with a multi-position control lever.

FIG. 8C Shows a front view of the multi-position control bracket and control lever.

FIG. 10A Shows a front view of an alternate assembled retractable safety support bracket.

FIG. 10B Shows a view of the two main elements of the retractable safety lift supported position

DESCRIPTION OF THE PREFERRED EMBODIMENTS

Figure 1:
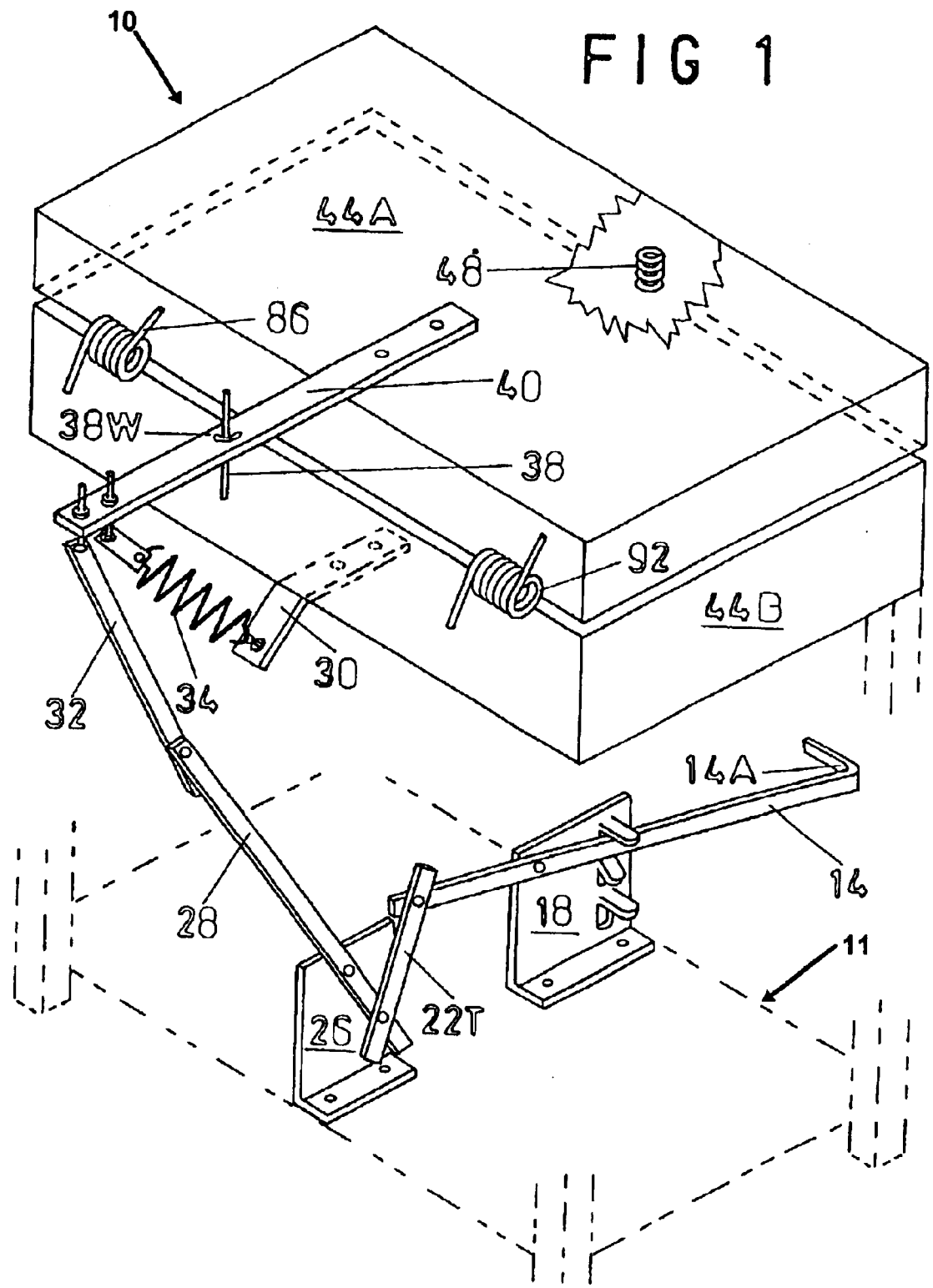
FIG. 1 Shows a left rear perspective view of main elements of the present invention with the cover of the cooking instrument in the closed position.

A cooking instrument 10, such as a grill, having a base 11 is shown in FIGS. 1–6 and has a foot operated cover lifting device including a control bracket 18 which is a right angle piece of metal which has six holes, two holes 20A are for mounting to base 11 of grill 10 shown in (FIG. 4) by conventional hardware (not shown). Another hole 18P (FIG. 3) mounts a stainless steel pivot bolt 16 which is connected with a pivotal Control Lever 14 which is a rectangular length of metal with two holes and a bend 14A at one end. Control lever 14 mounts to bracket 18 in an oversized hole 14P with a plurality of stainless steel disc or Lever Guide Springs 16D (FIGS. 3, 5) with three washers 16W and two stainless nuts 16N. Also mounted on control bracket 18 (FIGS. 1, 4) are three extrusions punched to form position holding fingers: a limit finger 18S, an open finger 18O and a closed finger 18C. The other remaining hole 14L of lever 14 (FIG. 5) is used to pivotally connect to a Control Link Arm 22T which is a rectangular length of metal with one hole at each end. Assembly of link arm 22T to control lever 14 is by means of bolt a 22B one washer, two nuts, an oversized hole 22L, lever guide springs 22D are spaced between arm 22T and lever 14 with two nuts, as shown in FIG. 5.

As shown in FIG. 1, a Driven Bracket 26 is a right angle metal bracket with three holes in it, two holes 20B are for mounting to base 11 of grill 10 by conventional hardware (not shown), the remaining hole 26P (FIG. 5) is for a pivot bolt 24. A driven lever 28, which is a length of rectangular metal with three holes, one of which is a pivot hole 28P, is pivotally attached to bracket 26 with two flat washers and two nuts, another hole 28L is for attaching driven lever 28 to arm 22T with oversized hole 22F and by means of a stainless bolt 22E, one washer, two lever guide springs 28D and two nuts, shown in FIG. 5. The last hole 28F of driven lever 28 is for pivotally attaching a Final Link Arm 32 which is also a length of rectangular metal, with two holes. One hole in arm 32 at 32L (FIG. 5) is for the connection to arm 22T which is assembled with a stainless bolt 32A and conventional hardware shown in FIG. 5. The other hole 32F of arm 32 (FIG. 2) is for a stainless bolt and conventional hardware and is to attach to conventional eye-bolt hardware 40F.

A Lift Support 40 is a metal bar which is rectangular and will have five holes in it, two of which 20D shown in FIG. 2 are for mounting to the top of a grill cover 44A by means of conventional hardware (not shown) and extends out to the back of grill 10. The other three holes of lift support 40 are: a hole for attaching an adjustable eye-bolt 40S to lift 40 (FIG. 2), then this attaches to a Transfer Drop Arm 36 which is a rectangular length of metal with two holes, the second hole is for drop arm 36 connecting by eye-bolt 40S to other side of lift spring 34. The third hole of support 40 is for fastening a adjustable eye-bolt 40F which is used for connection to link arm 32 at 32F with conventional hardware. The last hole is for a stainless steel threaded rod 38 and is attached to support 40 with stainless wing nuts 38 A rectangular metal bar forms a Stationary Support 30 (FIG. 2) and has three holes and one bend in it. Two holes 20C are for attaching to the bottom (brazier) 44B of cooking apparatus 10 by conventional hardware (not shown). Support 30 extends out behind bottom 44B. The other hole of support 30 is for attachment to lift spring 34 by means of conventional eye-bolt hardware 30S (FIG. 2).

Lift Spring 34 is a stainless steel spring wire wound tightly for tensional utility and is often called a tension or extension spring (FIGS. 1, 2). A pair of Pivot Springs 86 and 92 are attached between cover 44A and bottom 44B through elongated hinge bolts (not shown) with conventional hardware (not shown). Springs 86,92 are disposed at the hinge area for the cover 44A and bottom 44B. Pivot Springs 86 and 92 are stainless steel spring wire wound circularly for torsional use. Lever Guide Springs 16D, 22D, 28D are stainless steel spring cupped washers often called disc springs used in light compression as shown in FIGS. 3 and 5. A Closer Shock Spring 48 is a high temperature spring steel wire wound circularly with spacing often called a compression spring, spring 48 can be attached to Cover 44A with conventional hardware (not shown).

The operation of opening and closing the grill cover is shown in FIG. 2 (closed) and FIG. 6 (open). When facing the front of cooking instrument 10 control lever 14 is disposed outward in the rested position with bend 14A a few inches from the floor. Bend 14A will be far out enough so when standing at that position the chef will he clear of the rising smoke and heat when the cover is raised. When Cover 44A is closed, lever 14 can pivot vertically and horizontally, as shown in FIG. 4. When one touches down on lever 14 with a foot, from its closed position, at finger 18C in (FIG. 1) several events happen. At first, lever 14 pivots off mounted control bracket 18 at bolt 16 enabling the opposite end of lever 14 to pull up on control link 22T. Then the other end of link 22T, which is connected to driven lever 28, causes lever 28 to pivot around pivot bolt 24 mounted on driven bracket 26. The other end of lever 28 then pulls downwardly on link arm 32 which is joined to pull down lift support 40 mounted to lid 44A which opens cover 44A with the assistance of lift spring 34 which makes the operation quite easy.

The second function for lever 14 is to lock, by the individual's foot pressure, lever 14 to control bracket 18. The disc springs 16D, 22D, 28D, when slightly pre-loaded on assembly allow lever 14 and control link 22T to move horizontally and return to an aligned position. By way of moving the foot down to where lever 14 is under finger 18O shown at FIGS. 1 and 4 cover 44A will then stay open. Finger 18O has an angle that guides lever 14 to the left when it is on its way down to the limit stop finger 18S. When lever 14 has passed finger 18O toward finger 18S it will follow over to the right by the disc springs force, and the under 18O. When releasing foot pressure on lever 14 it will hold under finger 18O and stop lid 44A from closing thereby easily leaving the cover open and locked. Additional fingers may be provided to lock the cover at various partially opened positions. The fingers may also be higed to the braket to allow the user to use or not use certain fingers.

Several other parts of the present embodiment function in opening cover 44A, the torsion springs or pivot springs 86 and 92 will apply force. When the cover is approaching open at approximately 86 degrees, the pivot spring 86 is applied to keep a slightly positive force to close the lid whenever lever 14 is released with the foot. The other pivot spring 92 is applied later at approximately 92 degrees opening (when cover 44A is beginning to fall back), then it starts to counter the weight of lid 44A from falling back. These springs are sized to provide enough torsion to lightly assist in moving lid 44A back to the closed position. Also when lever 14 is applied, lift spring 34 gradually begins to lose its effectiveness at about 75 to 87 degrees upon opening the cover. Lift spring 34 is in tension and makes the weight of lid 44A minimal when moved by lever 14

The size of spring 34 will be different on other types of grills because the size and weight of the covers will not be the same, along with other factors such as pivot position, effective length of support 40, and the amount of food on the cover warming up. Transfer drop arm 36 is used as a floating link hinge so spring 34 will fall freely and drop out of the way. Otherwise it may be bound up in its retracted solid form, and jam the cover lifting operation, between support 40 (at eye-bolt 40S) and stationary support 30 (at eye-bolt 30S). When cover 44A is open it will be resting (with lever 14 under finger 18O) and at a stop position created by the location and adjustment of threaded rod 38. Rod 38 will contact the back wall of bottom 44B. Rod 38 is adjusted on lift support 40 by loosening wing nuts 38W and turning the rod to stop lid 44A to set the open position of cover 44A.

When lid 44A is being closed several elements of the present embodiments are utilized. Upon moving down and to the left with foot pressure on lever 14 from under finger 18O and then releasing it, lid 44A will start closing, threaded Rod Stop 38 releases from the back wall of bottom 44B. Pivot spring 92 in (FIG. 1) begins to no longer be applied, next pivot spring 86 also begins to not apply, gravity then starts to bring cover 44A to a close. Thereafter lift spring 34 starts application of force to minimize the weight and speed at which lid 44A closes. Lever 14 then returns to its place at finger 18C. About the same time bottom 44B becomes in close contact with the compression spring 48 on lid 44A which will stop any hammer effects when lid 44A is closed against brazier 44B. Lift spring 34 has now extended to full length, reducing the weight of cover 44A to almost nothing the next time it is opened.

Shown in FIG. 7 is an alternate embodiment of the present invention using a rod arm system comprising two rotating rods for operating the cover. The control rod is round stock having a plurality of angled bends and pivoting off a control bracket mounted on the grill frame. A final link bar consisting a metal bar with two eyes in it is connected to the grill cover. A similar control bracket as in the above described embodiment is used. The main element (control rod) is a multi-purpose clement replacing the driven bracket, control and driven lever, and hardware. The advantages are less material and this system will make mounting to pedestal grills and the like easier.

Shown in FIG. 7A is a single lever system comprising the control bracket 18 and control lever 14 as in the embodiment of FIGS. 1–6 and then including a rotatable pulley, with a groove about its circumference and mounted for rotation to a bracket, similar to driven bracket 26 (excluding driven lever 28) in the preferred embodiment, and having a control wire. One end of the control wire will have means for fastening to control lever 14 with conventional hardware (not shown). The other end of control wire having length wraps around the pulley and is fastened to lift support 40 with conventional hardware (not shown).The operation of control lever 14 will urge control wire to pull down on lift support 40 and lift the grill cover. As shown in (FIG. 7B) the single diameter pulley can be replaced with a two diameter pulley/two wire system which provides mechanical advantage to the system. This alternate double pulley will substantially decrease the travel needed for by lever 14 to lift the cover 44A.

FIGS. 8 show another embodiment of bracket 16 made from a rectangular length of metal pressed slightly to raise a plurality of sectioned surfaces and having one right angle bend as shown in FIG. 8B this metal control bracket can replace and improve the preferred embodiment control bracket 18 (fingers) 18S,18O,18C, by only dimpling the metal for the position controlling (holding points with movement of lever 14) of the cover. This bracket has a multi-position control throughout the cover opening process, allowing the chef to control the heat and moisture in cooking, and elongated mounting slots so that it can be retracted when not in use. This can also eliminate the lever guide springs 16D, 22D, 28D used in the preferred embodiment.

Figure 9:
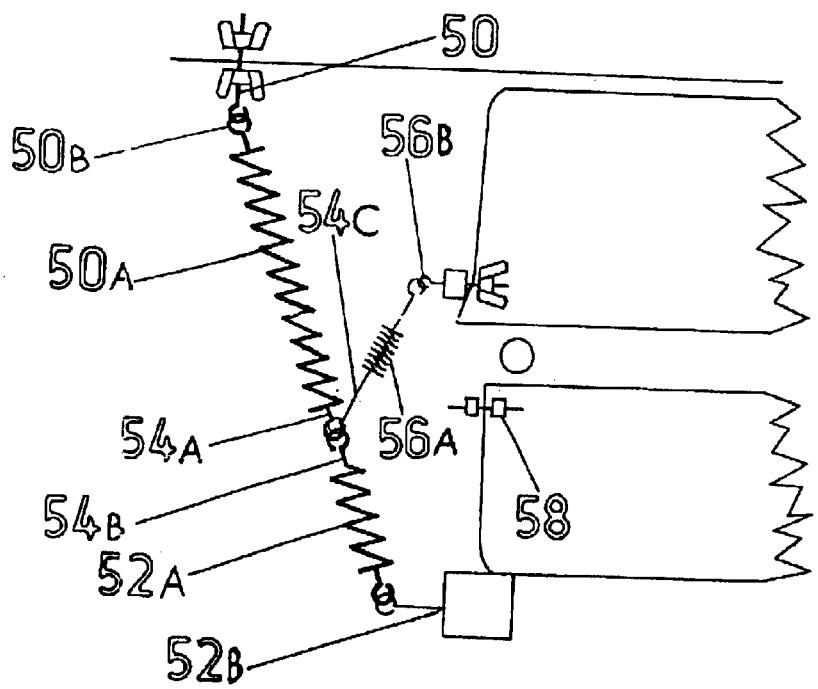
FIG. 9 Shows a view of an embodiment using three lift springs.
Figure 9A:
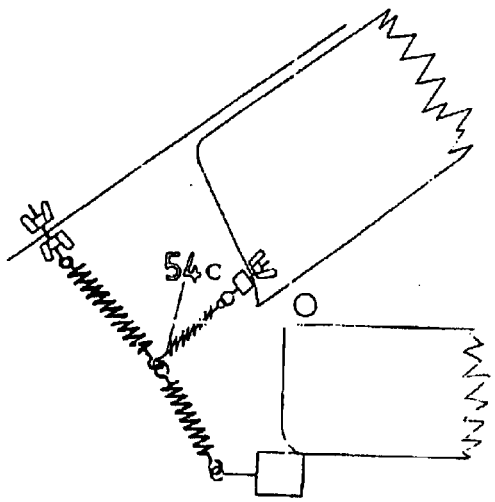
FIG. 9A Shows a view of the embodiment using three lift springs in a partially opened position FIG. 9B Shows a view of the embodiment using three lift springs in a fully opened position FIG. 10 Shows a side view of an additional embodiment of a cooking instrument with a motorized cover lift.

FIG. 9 show another embodiment of the present invention using three springs to replace lift spring 34. FIG. 9A shows an upper tension spring 50A with one pivot hook loop SOB attached to the lift support with conventional threaded eyebolt hardware and wing nuts. A lower tension spring 52A of a length and different tension than spring 50A is terminated to a stationary support 52B. The other ends of tension springs 50A and 50B are hooked together as shown at 54A, 54B. A third control spring 56A of lesser length and tension to is hooked at 56B to the hinged cover of the cooking instrument, the other end 54C is joined to the main springs 50A 52A at 54C by interconnecting loops. A spring plunger 58 is mounted to the brazier to form a cover stop.

Figure 9B:
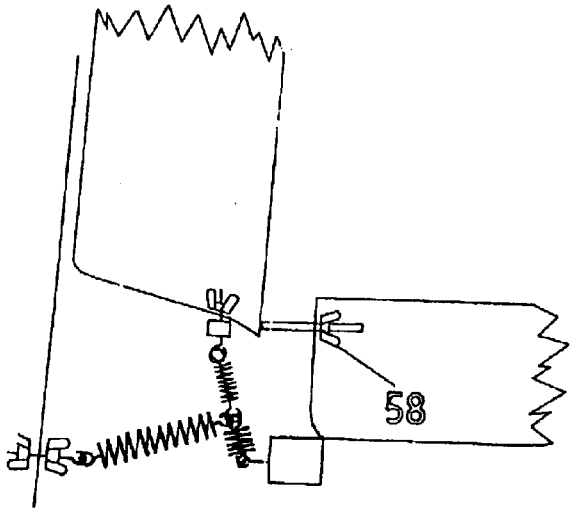

The two main springs 50A, 52A will decrease and increase in tension in conjunction with the mechanical movement of the cover and also by the changing distance and rate of tension of control spring 56A, see FIGS. 9B and 9C. As the cover becomes fully closed and the weight of it is maximized, the distance between the connections of the inline two main springs 50A, 52A to control springs 56A mounting is shortened. This lessens the deflection of main springs 50A, 52A allowing them to work at minimizing the cover weight. As the cover begins to open, and becomes lighter the distance between the main springs 50A, 52A and third control spring 56A is increased and thereby decreases the tension by control spring 56A deflecting (weakening) main springs 50A, 52A. As the cover completes its opening, the weight is considerably less requiring a lessened amount of tension. This is accomplished by the shorter mechanical distance of the springs, the retraction of main springs 50A, 52A, and the final smaller tension from control spring 56A. As the cover is fully opened spring loaded plunger 58 takes up the excess weight of the cover and provides an urge to the cover as it is mechanically compressed. The advantages of the arrangement of FIG. 9 are: to provide a large spring "pull" in a small space by the folding of the main inline springs by the spring tension of the third spring, to urge the main springs to fold together and out of the conventional path upon the movement of the cover, and to eliminate the drop link arm 36 in FIG. 2, of the preferred embodiment.

FIG. 10 shows an alternate embodiment of a cover opening and closing device for a cooking instrument having a reversible high torque electric motor 60, a forward and reversing switch 66, a mechanical wire 62 connected to the cover of the cooking instrument, a pulley 61, two limit control proximity sensors (not shown), and a power supply (63). Motor 63 will have limit stop switches (proximity switches) for opening and closing the cover with the ability to stop in any position within the covers full range of opening and closing. FIGS. 10A and 10B show a drawing jib 68 which is a piece of a right angle length of metal with three holes in it, a Ledger Support 70 which is a one piece right angle length of metal with two holes and one elongated slotted hole in it with a threaded bolt, four washers, one compression spring, and two nuts connecting the two parts which are used to replace support 40 in the preferred embodiment.

Other additional embodiments may be employed, without departing from the spirit and scope of the invention, including the use of cables or chains (such as beaded chains) to replace certain of the levers in the linkage system, such as but not limited to lever 32. The brackets 18, 26 used to mount the linkage can be constructed of any suitable materials, can be mounted at any appropriate location on the cooking instrument, can be combined into a single bracket and can be made integral with the cooking instrument. Similarly multiple levers can be be combined into a single lever. A counterweight system can be used instead of a lift spring to counterbalance the weight of the cover and where the cover is sufficiently light, a counterweight or spring can be eliminated entirely.

The present invention has been described with respect to exemplary embodiments. However, as those skilled in the art will recognize, modifications and variations in the specific details which have been described and illustrated may be resorted to without departing from the spirit and scope of the invention as defined in the appended claims.

What is claimed is:

1. A device for foot operation of the cover of a cooking instrument comprising:
   a) a lever disposed so as to be operated by the foot of an operator;
   b) lift support means attached to the cover of the cooking instrument
   c) a linkage connecting the foot operated lever and the lift support means;
   d) means for locking the foot operated lever at least one position;
   e) spring biasing means for attachment between a fixed part of the cooking instrument and the lift support means, said spring biasing means comprising three springs, two of said springs being mounted in series and the third spring being connected between the first and second springs with one end mounted to said fixed part of the cooking instrument; and
   f) said foot operated lever, lift support means, said linkage and spring biasing means cooperating to open said cover of the cooking instrument, upon depression of the foot operated lever with the assistance of the spring biasing means.

2. The device as claimed in claim 1 further including a bracket mounted to the cooking instrument for pivotally mounting said foot operated lever.

3. The device as claimed in claim 2 wherein said bracket includes fingers for releasably engaging the foot operated lever so as to lock the foot operated lever at said at least one position.

4. The device as claimed in claim 1 wherein said fixed part of the cooking instrument to which the third spring is connected is the cover of the cooking instrument.

5. The device as claimed in claim 1 wherein said fixed part of the cooking instrument to which the third spring is connected is the lift support means attached to the cover of the cooking instrument.

6. The device as claimed in claim 1 wherein said linkage connecting the foot operated lever and the lift support means comprises a series of pivotally mounted levers.

7. The device as claimed in claim 1 wherein said linkage connecting the foot operated lever and the lift support means comprises at least one cable.

8. The device as claimed in claim 1 wherein said linkage connecting the foot operated lever and the lift support means comprises at least one chain.

9. The device as claimed in claim 1 wherein the position that the foot operated lever is locked is the open position.

10. The device as claimed in claim 1 wherein the position that the foot operated lever is locked is a partially open position.

11. A cooking instrument, having a cooking portion and a hinged cover portion, with means for opening and closing the cover portion comprising:
    a) a lever disposed so as to be operated by the foot of an operator;
    b) lift support means attached to the cover of the cooking instrument
    c) a linkage connecting the foot operated lever and the lift support means;
    d) means for locking the foot operated lever at least one position;
    e) spring biasing means for attachment between a stationary part of the cooking instrument and the lift support means said spring biasing means comprising three springs, two of said springs being mounted in series and the third spring being connected between the first and second springs with one end mounted to a fixed part of the cooking instrument; and
    f) said foot operated lever, lift support means, said linkage and spring biasing means cooperating to open said cover of the cooking instrument, upon depression of the foot operated lever with the assistance of the spring biasing means.

12. The cooking instrument as claimed in claim 11 further including a bracket mounted to the cooking instrument for pivotally mounting said foot operated lever.

13. The cooking instrument as claimed in claim 12 wherein said bracket includes fingers for releasably engaging the foot operated lever so as to lock the foot operated lever at said at least one position.

14. The cooking instrument as claimed in claim 11 wherein at least one of said first, second and third springs of said spring biasing means comprise coil springs.

15. The cooking instrument as claimed in claim 11 wherein said linkage connecting the foot operated lever and the lift support means comprises a series of pivotally mounted levers.

16. The cooking instrument as claimed in claim 11 wherein said linkage connecting the foot operated lever and the lift support means comprises at least one cable.

17. The cooking instrument as claimed in claim 11 wherein said linkage connecting the foot operated lever and the lift support means comprises at least one chain.

18. The cooking instrument as claimed in claim 11 wherein the position that the foot operated lever is locked is the open position.

19. The cooking instrument as claimed in claim 11 wherein the position that the foot operated is a partially open position.

20. A device for foot operation of the cover of device comprising:
    a) a level disposed so as to be operated by the foot of an operator;
    b) lift support means attached to the cover of the device;
    c) a linkage connecting the foot operated lever and the lift support means;
    d) means for locking the foot operated lever at least one position;
    e) spring biasing means for attachment between a fixed part of device and the lift support means, said spring biasing means comprising three springs, two of said springs being mounted in series with the third spring being connected between the first and second springs with one end mounted to a fixed part of the device; and
    f) said foot operated lever, lift support means, said linkage and spring biasing means cooperating to open said cover of the device, upon depression of the foot operated level with the assistance of the spring biasing means.

* * * * *